United States Patent [19]

Baader et al.

[11] Patent Number: 5,047,679

[45] Date of Patent: Sep. 10, 1991

[54] CASING FOR A SMALL MOTOR ASSEMBLY

[76] Inventors: Edward J. Baader, 232 Stephen La.; Joseph E. Baader, 333 Holiday Dr., both of Springfield, Ohio 45505

[21] Appl. No.: 575,023

[22] Filed: Aug. 30, 1990

[51] Int. Cl.⁵ .............................................. H02K 5/00
[52] U.S. Cl. ...................................... 310/89; 310/42; 310/239
[58] Field of Search ................... 310/42, 89, 258, 239, 310/242, 247, 245, 40 MM, 248, 91, 233

[56] References Cited

U.S. PATENT DOCUMENTS

| | | | |
|---|---|---|---|
| 3,488,836 | 1/1970 | Wheeler | 310/42 |
| 4,355,253 | 10/1982 | Vollbrecht | 310/239 |
| 4,420,704 | 12/1983 | Mabuchi | |
| 4,465,946 | 8/1984 | Springer | 310/89 |
| 4,475,053 | 10/1984 | Mayer | 310/239 |
| 4,571,515 | 2/1986 | Baader | 310/239 |
| 4,673,838 | 6/1987 | Takagi et al. | 310/239 |
| 4,694,214 | 9/1987 | Stewart | 310/239 |
| 4,728,835 | 3/1988 | Raines | 310/42 |

FOREIGN PATENT DOCUMENTS

| | | | |
|---|---|---|---|
| 0267668 | 1/1969 | Austria | 310/89 |
| 0048213 | 3/1982 | European Pat. Off. | 310/89 |

Primary Examiner—R. Skudy
Attorney, Agent, or Firm—David H. Semmes

[57] ABSTRACT

Dynamoelectric motors, particularly, a brush and brush holder assembly which comprises three semi-circular motor casing sides manufactured of non-insulating material. The semi-circular casing elements are snap-fitted together so as to support three individual brushes in contact with a commutator. The snap-fitted assembly is characterized by its structural simplicity, as well as ease of manufacture and assembly.

6 Claims, 3 Drawing Sheets

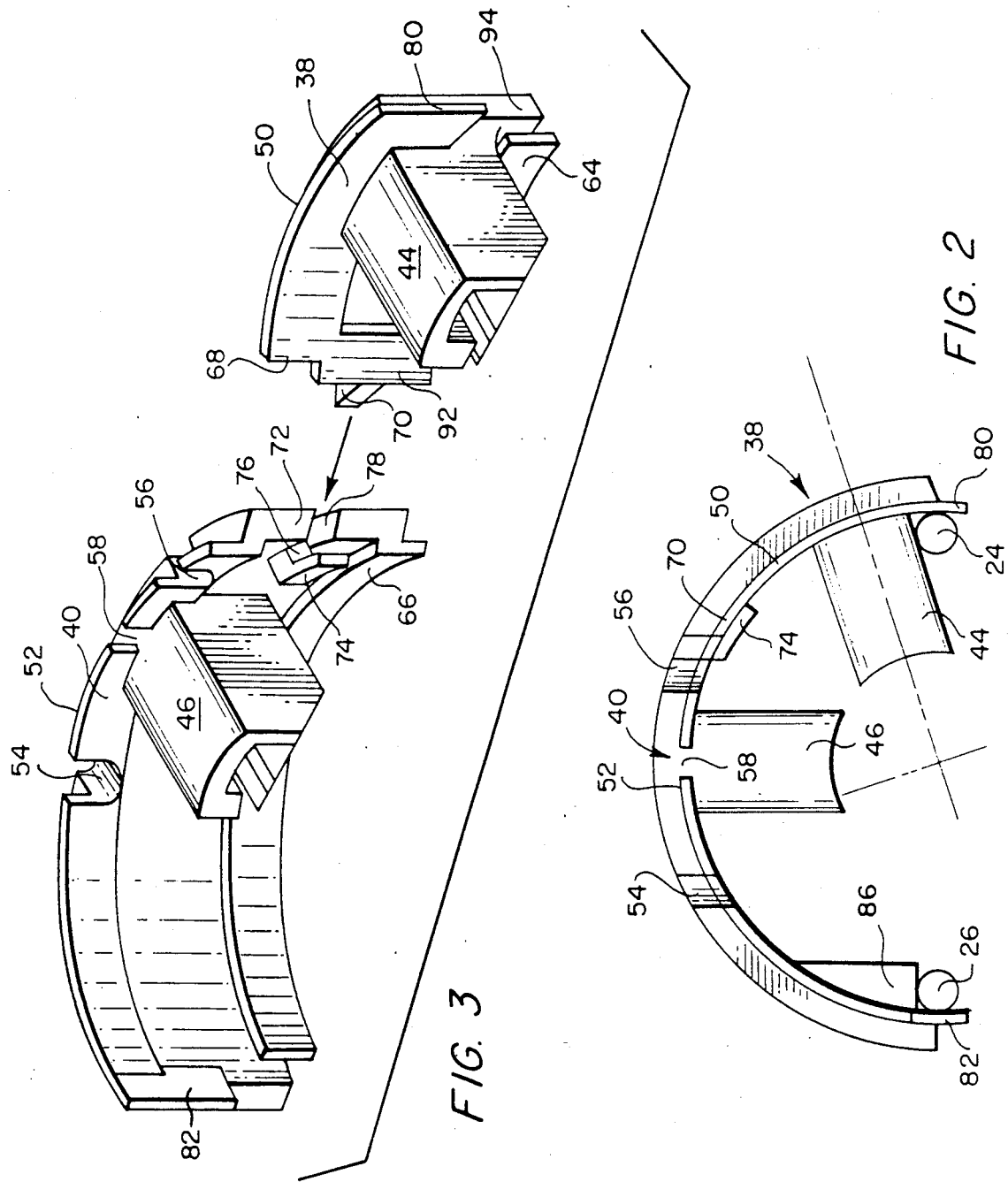

CASING FOR A SMALL MOTOR ASSEMBLY

CROSS REFERENCES TO RELATED APPLICATIONS

An improvement upon applicant Edward J. Baader's SMALL MOTOR ASSEMBLY U.S. Pat. No. (4,571,515).

BACKGROUND OF THE INVENTION

1. Field of the Invention

Electric motors, particularly, non-insulating casing assemblies for supporting the brushes in resilient contact with a rotating commutator.

2. Description of the prior art

Being submitted separately in an Information Disclosure Statement.

SUMMARY OF THE INVENTION

A brush holder assembly for dynamoelectric motors, including three semi-circular casing sides snap-fitted together, so as to support three individual brushes in radial abutment with a rotating commutator. The motor casing sides are characterized by axially extending flanges for engagement with a magnet ring housing at one end and a motor casing top cap at the other end. Each motor casing side may include a radially extending brush housing which supports a compression spring and a brush which is urged inwardly against a commutator. Power may be applied to brushes number one and two to develop a single speed. Power may be applied to brushes number one and three to develop a second and faster speed.

DESCRIPTION OF THE DRAWINGS

FIG. 2 is a top plan of the first semi-circular motor casing side 40 snap-fitted with respect to the third motor casing side 38.

FIG. 3 is an exploded view, showing the snap-fitting of the first motor casing side 40 and the third motor casing side 38.

DESCRIPTION OF THE PREFERRED EMBODIMENTS

Figure 1:
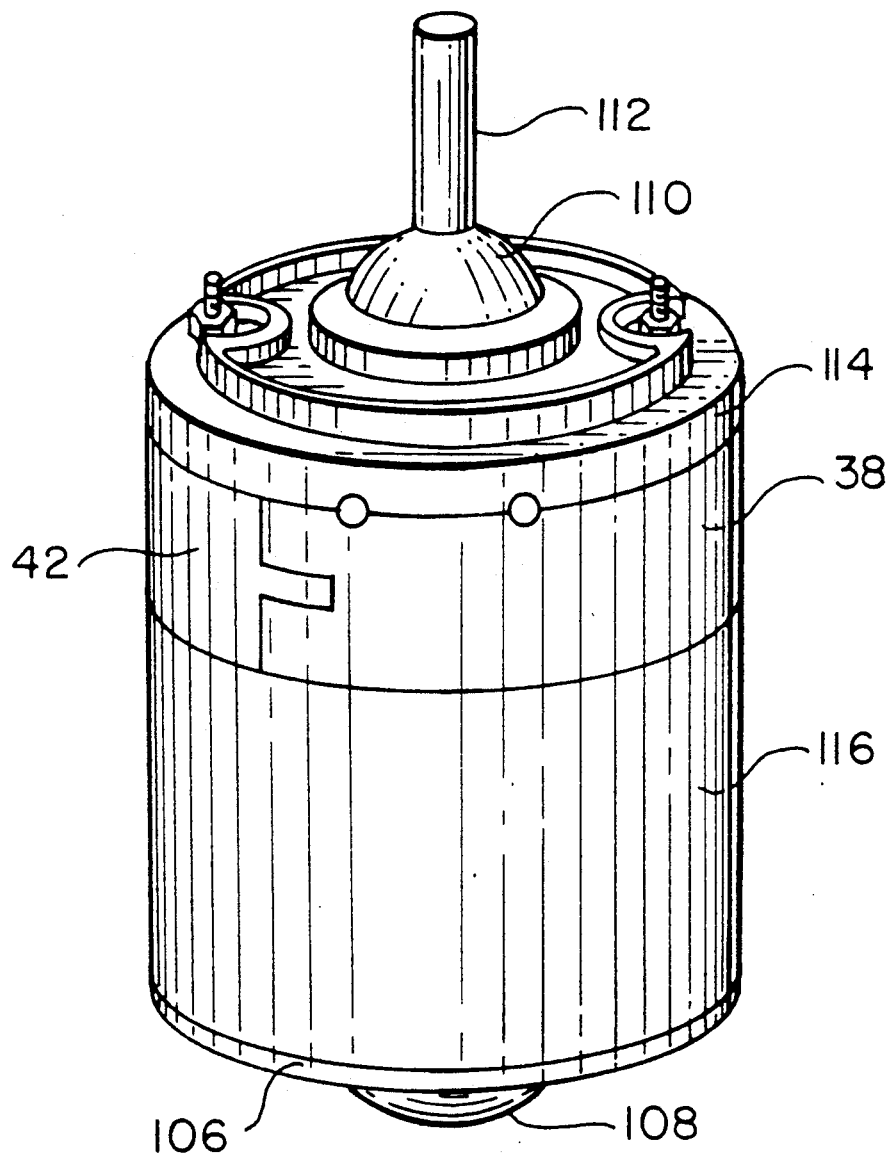
FIG. 1 is a perspective view of the assembly including three semi-circular motor casing sides snap-fitted together and superposed with respect to the magnet ring housing.

In FIG. 1, a small motor assembly is illustrated as including a closed motor case top cap 106 superposed with respect to semi-circular motor casing sides 42, 38 which are snap-fitted together so as to engage axially both bottom cap 114 and magnet ring housing 116. A bottom cap 114 includes an axial protuberance 110 with shaft 112 extending axially therethrough.

Figure 4:
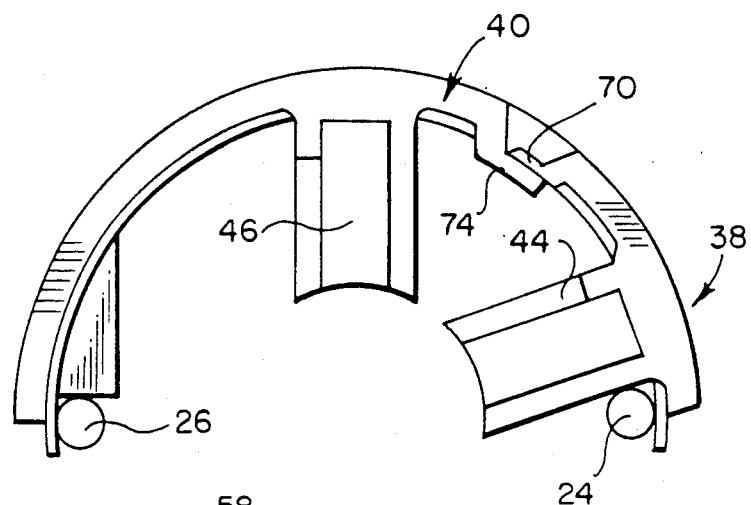
FIG. 4 is a horizontal sectional view of the motor casing sides 40, 38 snap-fitted together.

In FIG. 2, the first motor casing side 40 and the third motor casing side 38 are shown snap-fitted together by means of medially extending prong engaging hook arm 74 and slot between bifurcations 72, 78 on the first motor casing side 40. As shown in FIG. 4 the snap-fitting of the motor casing sides 38, 40 positions them adjacent vertically extending shafts 24, 26.

As will be apparent in FIGS. 2 and 3, first motor casing side 40 includes axially extending top flange 52 and axially bottom flange 66, as well as apertures 54 and 56, for the entry of pig-tail wires to the individual axially extending brush housings 44, 46. An inset or notch 58 may be defined above brush housing 46.

Figure 7:
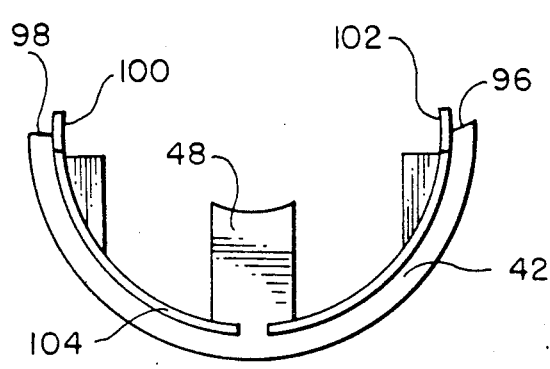
FIG. 7 is a top plan of second motor casing side 42.

A peripherally extending end tab 82 may be defined in top flange 52 so as to complementally engage the peripherally extending end tab 100 extending from the bottom flange 104 of second motor casing side 42. As illustrated in FIG. 7, inset shoulder 98 engages and supports end tab 82 (FIG. 2).

Axially extending commutator brush housing 46 is adapted for support of a brush and spring assembly (not shown in drawings) so that the individual brush assembly contacts the rotating commutator. At the other end of first motor casing side 40 are a pair of peripherally extending bifurcations 72, 78 which define a hook slot acting complementally with longitudinally extending arm 74 to engage the medially extending prong 70 defined at end tab 92 of third motor casing side 38.

As illustrated in FIGS. 2 and 3, third motor casing side 38 includes axiallly extending top flange 50 and axially extending bottom flange 64, inset with respect to the end tab 80 such that third motor casing side 38 may complementally engage second motor casing side 42, end flange 102 and shoulder 96. The abutting surface 94 may be angularly disposed so as to enhance snap-fitting second and third motor casing sides.

FIGS. 2, 5, 6 and 7, respectively a top and bottom plan of the snap-fitted motor casing assemblies, show the second motor casing side 42 peripherally having extending upper flange 60 with a gap or aperture 62 defined over axially extending brush housing 48 and inclined end surface abutting with angled surface or shoulder 96 94 of, the third motor casing side 38. Manifestly, the second motor casing side end tabs 100, 102 engage, respectively, the end tabs 82, defined in the top flange of the first motor casing side 40 and the end flange 80 defined in the top flange of third motor casing side 38. Reinforcing shoulders 86, 88 and 90 may be formed respectively in first motor casing side 40 and second motor casing side 42.

Figure 5:
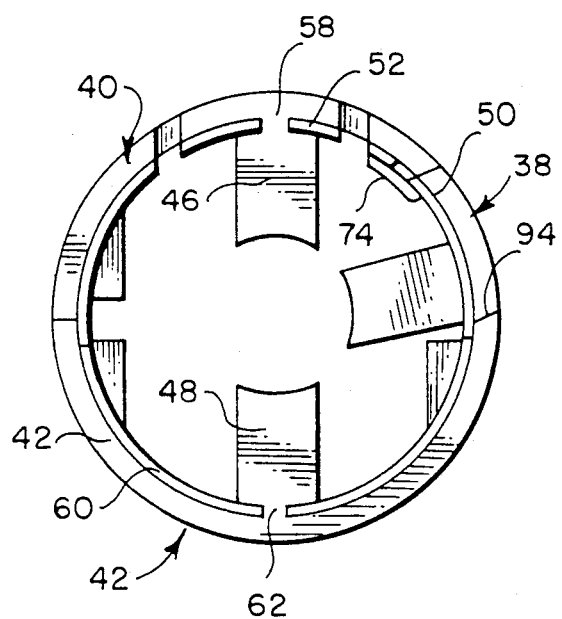
FIG. 5 is a top plan of the snap-fitting of the first motor casing side 40, second motor casing side 42 and third motor casing side 38.
Figure 6:
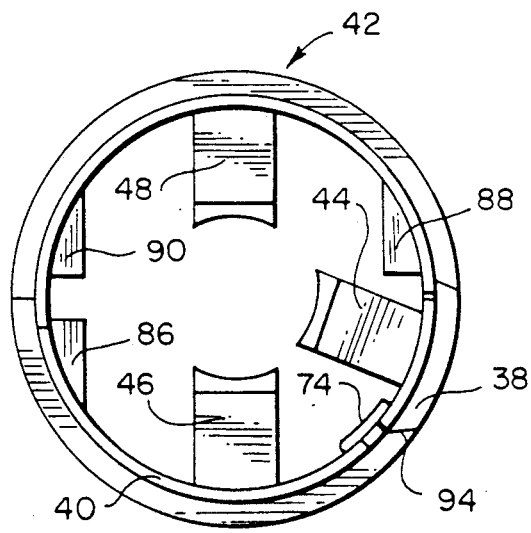
FIG. 6 is a bottom plan of the snap-fitted motor casing sides.

As will be apparent, the motor casing sides may be inexpensively and precisely molded from plastic so as to be firmly snap-fitted together. As a result, a motor casing side is provided which enables two speed operation of a small motor assembly. For example, in order to achieve a single speed, power may be applied to brushes in housings 46 and 48, as illustrated in FIG. 5. To achieve a faster speed, power may be applied to the brushes positioned in axially extending housings 48 and 44 (FIG. 6).

Manifestly, variations in snap-fitting structure may be employed without departing from the spirit of the invention.

We claim:

1. A snap-fitted assembly of motor casing sides adapted for use as a dynamoelectric brush holder assembly of the type having a commutator, said brush holder assembly supporting electric brush assemblies contacting the commutator comprising:

a) a first semi-circular motor casing side adapted for snap-fitting with second and third motor casing sides, said first semi-circular motor casing side further including:

i) top and bottom peripherally extending inner flanges;

ii) a peripherally extending tapered end tab, extending at one end from a top flange of said first semi-circular motor casing side so as to be complementally engagable with a corresponding end tab extending from a bottom of a second motor casing side;

iii) a radially extending brush housing having an open radially extending slide in its side so as to support a compression spring and brush assembly in contact with the commutator; and iv) a medial locking hook and slot defined at an other end of said top flange;

b) a second semi-circular motor casing side adapted for snap-fitting with said first semi-circular motor casing side and a third semi-circular motor casing side, further including:

i) top and bottom axially extending inner flanges;

ii) peripherally extending tapered end tabs extending from both ends of the bottom axially extending inner flange so as to be complementally engagable with end tabs peripherally extending from top flange ends of said first semi-circular motor casing and said third semi-circular motor casing side; and iii) a radially extending brush housing having an open, radially extending slide in its side so as to support a compression spring and brush assembly in contact with the commutator; and c) a third semi-circular motor casing side snap-fitted to open ends of said first semi-circular motor casing side and said second semi-circular motor casing side, and further including:

i) top and bottom axially extending flanges;

ii) peripherally extending tapered end tab defined at one end of the top axially flange so as to be complementally engagable with an adjacent end tab, defined on the bottom axially extending flange of said second semi-circular motor casing side and a medially extending tab defined at the other end of said top axially extending flange so as to be complementally engagable with said medial locking hook and slot in said first semi-circular motor casing side; and iii) a radially extending brush housing having an open radially extending slide in its side so as to support a compression spring and brush assembly in contact with the commutator.

2. A snap-fitted assembly of motor casing sides as in claim 1, said first semi-circular motor casing side having at least one wire hold defined in its top axially extending flange.

3. A snap-fitted assembly of motor casing sides as in claim 2, said third semi-circular motor casing side including an inset shoulder defined at one end of said bottom axially extending flange so as to be complementally engagable with said end tab on said second motor casing side.

4. A snap-fitted assembly of motor casing sides as in claim 3, said semi-circular first motor casing side locking hook being in the form of an elongate inner arm co-extensive with said medially extending tab of said third motor casing side.

5. A snap-fitted assembly of motor casing sides as in claim 4, said first semi-circular motor casing side having a bifurcated tab extending from its other end so as to define said hook and slot and complementally engage said medially extending tab of said third motor casing side.

6. A snap-fitted assembly of motor casing sides as in claim 5, said bifurcated tab and said medially extending tab being complementally angled.

* * * * *